Sept. 27, 1932.     H. H. HARMONY     1,879,220
FLOWER RECEPTACLE
Filed Nov. 5, 1929     2 Sheets-Sheet 1
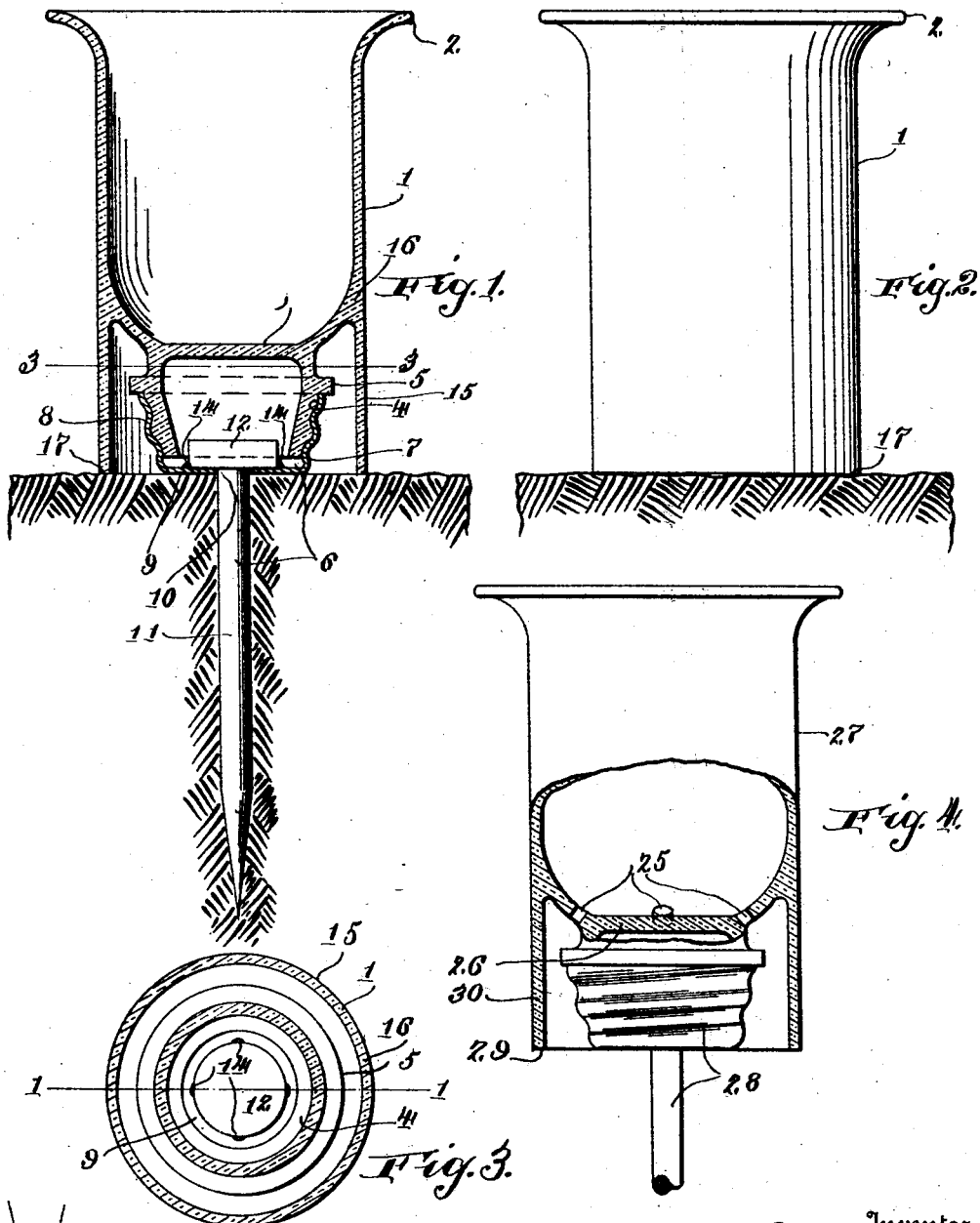

Sept. 27, 1932.  H. H. HARMONY  1,879,220
FLOWER RECEPTACLE
Filed Nov. 5, 1929   2 Sheets-Sheet 2
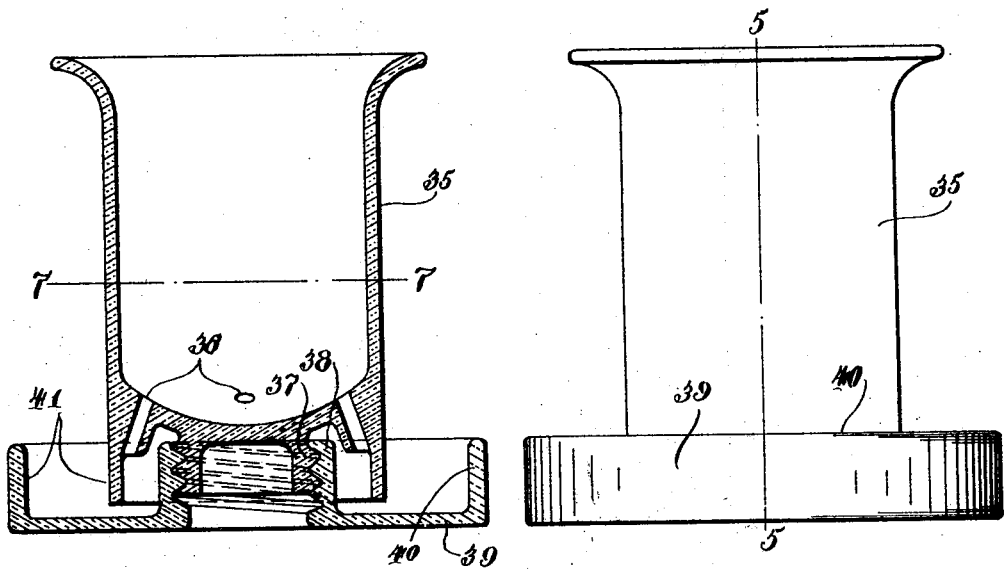
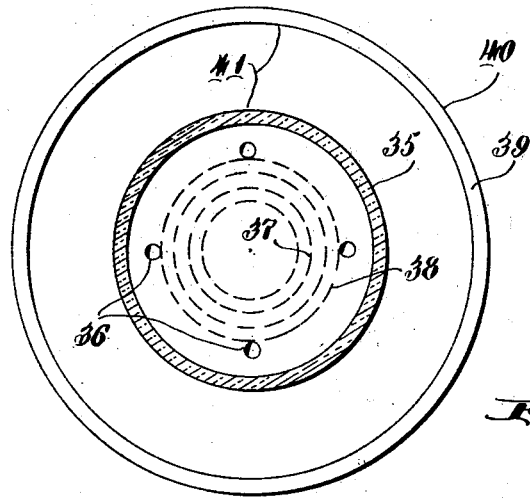

Patented Sept. 27, 1932

1,879,220

UNITED STATES PATENT OFFICE

HARRY H. HARMONY, OF CHAMBERSBURG, PENNSYLVANIA, ASSIGNOR TO FLORENCE MAY HARMONY, OF CHAMBERSBURG, PENNSYLVANIA

FLOWER RECEPTACLE

Application filed November 5, 1929. Serial No. 404,890.

The present invention refers to a receptacle particularly for use as a flower vase on graves.

The well-known metal inverted cone shaped receptacle having a sharp pointed projection in the form of a pin at the bottom thereof for the purpose of positioning the receptacle in the mound of the grave, has the disadvantage when left on the grave for a few months, of rusting out and becoming leaky, thereby defeating the very purpose for which the structure was made, i. e., for containing water for the purpose of prolonging the life of cut flowers that may be placed on the grave. Another disadvantage of this device is that the supporting pin being an integral part of the structure, it must be withdrawn from the ground when it is desired to carry the receptacle to a source of water supply for the purpose of filling same for placing therein the cut flowers to be placed on the grave, and as can be noted in practice in the replacing of these receptacles in the mounds, the positions are seldom, if ever, uniform. Due to the fact that the pin, having to be removed from the ground each time, can not be made sufficiently long to have the proper stabilized support for the device, the result is that in most instances one will find these receptacles tilted to various angles, making what otherwise would be a well kept grave mound look unsightly.

The present device was invented for the purpose of overcoming these various disadvantages in that the invention has a receptacle support in the form of a pin or spike so constructed as to allow the pin to remain in the ground when it is desired to remove the main body portion of the flower receptacle for filling with water preparatory to inserting cut flowers therein.

The body portion of the receptacle and its engaging means with the pin or supporting structure is designed in such a manner as to enable the inventor to make the same of glass, thus allowing for the manufacture of a device that might be used on a grave mound indefinitely without becoming deteriorated or leaky due to the action of the elements; also, being made of glass, it will not become unsightly due to the action of the elements thereon but will retain indefinitely its original newness of appearance, thus allowing for the use on a grave mound of a flower receptacle that will not look unsightly, but rather add to the appearance of a well-kept grave.

An important object of the present invention is to provide a flower receptacle for use on graves, having means for allowing the support of the receptacle to remain in the ground when it is desired to remove the receptacle.

Still another object of the present invention for a flower receptacle, is to have means thereon for the protection of the positioning member from the elements.

Still another object of the present invention is to provide means for driving the receptacle positioning member into the ground without injury thereto.

Another object of the present invention is to provide means for draining water therefrom when the same may be used for the purpose of growing potted plants therein.

Still another object and purpose of the present invention is to provide a one piece receptacle having means thereon for rigidly positioning the same to the ground surface.

In the accompanying drawings I have illustrated a flower receptacle, particularly adaptable to be used on grave mounds, embodying the various features of my invention in their preferred form.

In the drawings:

Figure 1 is a sectional view taken substantially along the line 1—1 of Figure 3, illustrating the invention in operative position as applied to the ground surface.

Figure 2 is a side elevation of the invention illustrating the receptacle portion of the device as it would appear on the surface of a grave mound.

Figure 3 is a sectional view in plan taken substantially along the line 3—3 of Figure 1.

Figure 4 is a side elevation of a slightly modified form of the invention, being partly broken away for illustrative purposes.

Figure 5 is a sectional view in elevation on the line 5—5 of Figure 6, disclosing a modified form of receptacle and base.

Figure 6 is a side elevation of the same.

Figure 7 is a sectional view in plan taken on the line 7—7 of Figure 5.

Referring to the drawings by numerals, each of which is used to indicate the same or similar parts in the different figures, the construction and invention shown consists of a flower receptacle 1, having a flared upper portion 2 and, a bottom 3. Depending beneath said bottom portion and integral therewith is a threaded portion 4, having a shoulder 5. For the purpose of positioning the receptacle member 1 to the ground a receptacle positioning member 6 is provided having a cup shaped threaded head portion 7, the threaded side walls 8 of which are preferably tapered for the purpose of more readily permitting the initial insertion and screwing therein of the threaded portion 4 of the receptacle into the same. The head portion 7 of the receptacle positoning means is provided with a bottom 9, the same having a hole 10 therein through which is inserted the pin 11, for the purpose of rigidly securing the receptacle positioning member 6 to the ground. The pin 11 may have a head 12 thereon, which, in turn, may be rigidly engaged to the bottom portion 9 of the head portion 7 by means of spot welding, as shown at 14. Pin 11 may, if desired, be integrally mounted on and through the cup-shaped member 7. This head 12 is provided principally for the purpose of enabling the spike or pin 11 to receive hammer blows without injury to the rest of the structure, this pin may be of any substantial length and be securely driven for its full length into the grave mound, thus allowing for a permanent rigid and substantial structure for the purpose of supporting the receptacle member 1.

It is understood that the receptacle positioning member 6 may be heavily plated with a noncorrosive metal for the purpose of giving the same longer effective life. To also increase the effective life of the exposed threaded metal portion of the receptacle positioning member 6, a depending skirt 15 that is integral with the body portion 16 of the receptacle is provided. This skirt 15 completely surrounds the exposed threaded head portion 7 of the receptacle positioning member and coming in contact with the ground surface at 17, acts as a closure or seal to protect the head 7 from the deteriorating effects of the elements. The whole of the body portion 16 of the receptacle 1 being made of glass, would tend in combination with the sealing effect of the skirt 15 to unlimited life or usefulness of this present structure due to the fact that no metal portions of the same are exposed to the elements and the corrosive effects thereof. Thus it will be seen from Figure 1 that bottom 3 is positioned at a point substantially above the lower termination 15 of the wall of the receptacle.

As may be readily seen, the operation of the invention is as follows:

The receptacle positioning member 6 is unscrewed from the threaded portion of the receptacle and driven securely into the grave mound. The receptacle member 1 may then be screwed into place by means of the threaded portion 4 of the receptacle and the threaded portion 8 of the positioning member 6, thus allowing for a rigid and substantial positioning means for the flower receptacle 1. Should it be desired to remove the receptacle at any time for the purpose of carrying the same to some remote source of water supply, it is only necessary to detach the receptacle from its positioning member 6 by unscrewing the same therefrom, thus a very simple and inexpensive structure is provided for either removing or attaching the flower receptacle to a permanent positioning means for the same without the inconvenience of removing the positioning means from the ground and reinserting the same in the ground each time it is found necessary to remove the receptacle.

Referring to Figure 4, this illustration discloses a slightly modified form of the present invention, the same consisting of the provision of drain holes 25 in the bottom 26 of a flower receptacle 27, having a receptacle positioning member 28. The purpose of the modified structure is to allow for the receptacle 27 to be used for potted plants or the like, where it is necessary to provide a drain for the water that is poured into the container for potted plants in the cultivation thereof. Thus a structure is provided that allows for the removal of potted plants from fixed positions in a garden by removal of the receptacle with the plant therein in severe weather into the house or some unexposed location, the bottom portion 29 of the skirt 30, forming a substantial base for the receptacle when the same may be placed on a hard flat surface indoors.

Reference being made particularly to Figures 5, 6 and 7, which disclose another modified form of receptacle and base therefor, it will be noted that the receptacle 35 has a plurality of holes 36 in the bottom thereof which serve to adapt the receptacle to be used for growing potted plants therein, the holes 36 allowing for the proper drainage of water used in watering the plants. The downwardly disposed threaded portion 37 of the receptacle engages the upwardly disposed threaded portion 38 of the base member 39. As will be noted, the base 39 has an upwardly disposed flange 40 about its outside edge, thus forming a trough 41 about the receptacle for the purpose of holding the water that has drained through the holes 36 of the receptacle. As will be seen, the base member 39 is well adapted for use as a support for the receptacle when the same is to be placed on a hard flat surface such as a table or flower stand.

As may be readily seen, the preferred form of flower receptacle may be supported in a base of similar structure when it is desired to set the same on a hard flat surface for the purpose of giving greater stability thereto.

I have thus described specifically and in detail a flower receptacle particularly for use on grave mounds, embodying the features of my invention in the preferred form, however, the specific terms herein are used descriptively rather than in a limiting sense and the scope of the invention is defined in the claims.

What I claim as new and desire to secure by Letters Patent is:

1. A flower receptacle having a bottom therein, holes in said bottom for the purpose of draining water therethrough, a threaded portion on the underside of said bottom, ground positioning means for said receptacle in the form of a threaded cup shaped member adapted to be screwed to said threaded portion of the receptacle, a protective skirt about said threaded members forming a protective enclosure against the elements when in their operative and engaged position, a pin integrally mounted on said cup shaped member for the purpose of securely positioning same to the upper surface of the ground, a head on said pin to facilitate driving the pin into the ground.

2. A flower receptacle having a bottom therein, a threaded portion on the underside of said bottom, ground positioning means for said receptacle in the form of a threaded cup shaped member adapted to be screwed to said threaded portion of the receptacle, a protective skirt about said threaded members forming a protective enclosure against the elements when in their operative and engaged position, a pin integrally mounted on said cup shaped member for the purpose of securely positioning same to the upper surface of the ground, a head on said pin to facilitate driving the pin into the ground.

3. A flower receptacle having a bottom formed therein and positioned at a point substantially above the lower termination of the walls of said receptacle, said bottom having a threaded portion formed on the underside of the same, ground positioning means for said receptacle in the form of a threaded cup shaped member for purposes of threadedly engaging thereto the said threaded portion formed on the under side of the receptacle, said threaded cup-shaped member having a pin integrally mounted therethrough for positioning said member to the upper surface of the ground, a head on said pin within the cup member to facilitate driving the pin into the ground.

Signed by me at Chambersburg, Franklin County, Pennsylvania, this 9th day of September, 1929.

HARRY H. HARMONY.